United States Patent [19]

Atkinson et al.

[11] Patent Number: 5,570,501

[45] Date of Patent: Nov. 5, 1996

[54] GASKET MANUFACTURE

[75] Inventors: Alan W. Atkinson, Barby; Melanie J. Walsh, Braunston, both of England

[73] Assignee: T&N Technology Limited, Rugby, England

[21] Appl. No.: 351,277

[22] PCT Filed: Jul. 14, 1993

[86] PCT No.: PCT/GB93/01480

§ 371 Date: Dec. 7, 1994

§ 102(e) Date: Dec. 7, 1994

[87] PCT Pub. No.: WO94/03742

PCT Pub. Date: Feb. 17, 1994

[30] Foreign Application Priority Data

Aug. 5, 1992 [GB] United Kingdom .................. 9216604

[51] Int. Cl.⁶ ...................................................... F16J 15/12
[52] U.S. Cl. ...................... 29/527.2; 156/219; 156/279; 264/112; 264/113
[58] Field of Search ................................. 29/469.5, 521; 156/62.2, 228, 209, 219, 279; 277/235 A, 235 B; 264/113, 119, 112, 135; 428/184, 318.6

[56] References Cited

U.S. PATENT DOCUMENTS

| | | | |
|---|---|---|---|
| 2,444,394 | 3/1943 | Arnold | 156/228 X |
| 3,028,667 | 4/1958 | Wintermute et al. | 29/469.5 |
| 4,876,876 | 10/1989 | Ishida et al. | |
| 5,226,662 | 7/1993 | Justus. | |

FOREIGN PATENT DOCUMENTS

| | | | |
|---|---|---|---|
| 0052485 | 5/1982 | European Pat. Off. . | |
| 0338536 | 10/1989 | European Pat. Off. | F02F 11/00 |
| 2088491 | 6/1982 | United Kingdom | F16J 15/06 |
| 2088490 | 6/1982 | United Kingdom | F16J 15/12 |
| 2128271 | 4/1984 | United Kingdom | F16J 15/10 |
| 2145960 | 4/1985 | United Kingdom . | |
| 2145960 | 4/1985 | United Kingdom | B30B 15/02 |
| 2156012 | 10/1985 | United Kingdom | F16J 15/12 |
| 9308420 | 4/1993 | WIPO | 277/235 B |

Primary Examiner—Michael W. Ball
Assistant Examiner—Sam Chuan Yao
Attorney, Agent, or Firm—Synnestvedt & Lechner

[57] ABSTRACT

An embossed sheet coated at least partially with expanded graphite and suitable for use as a gasket or as a component layer of a gasket is manufactured by positioning a planar metallic sheet between an upper embossing die and a lower embossing die with a layer of particles of expanded graphite between one of said dies and a surface of the sheet. One of the dies has a protuberance to emboss a ridge into the sheet while the other die has a recess to receive the ridge. The method also comprises pressing the dies together to cause the particles to coalesce and form a coating attached to the sheet while simultaneously embossing said ridge into the sheet.

10 Claims, 2 Drawing Sheets

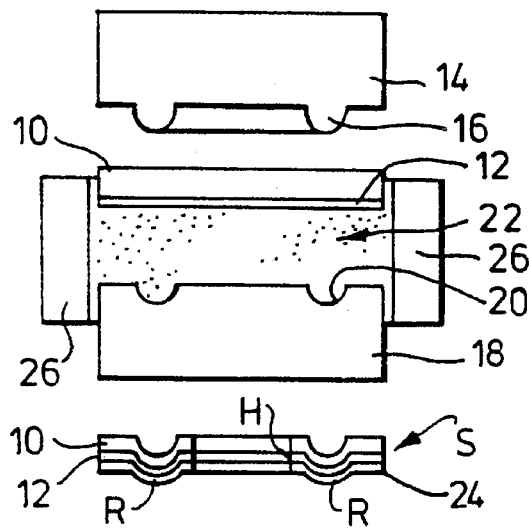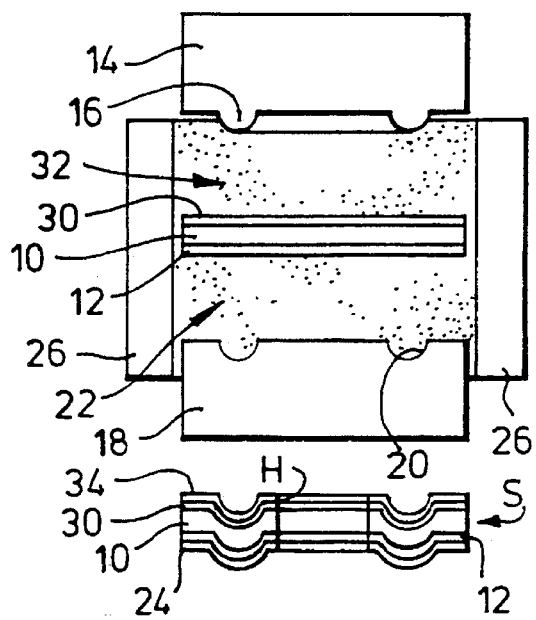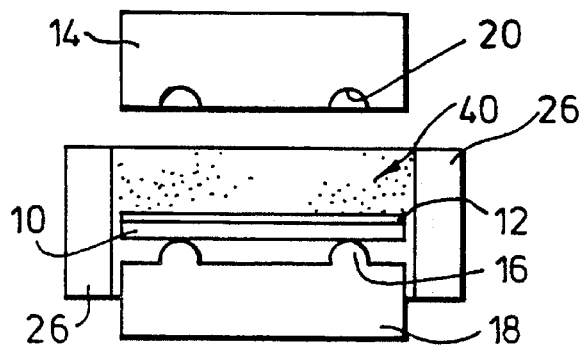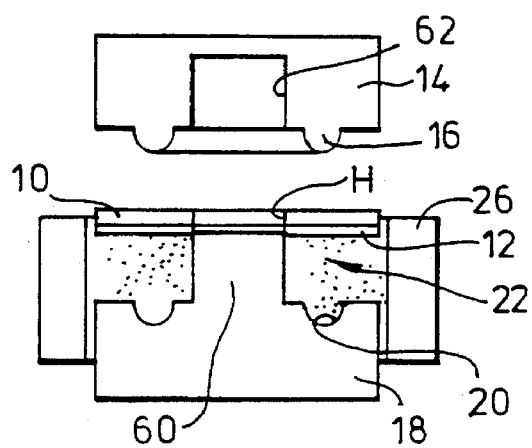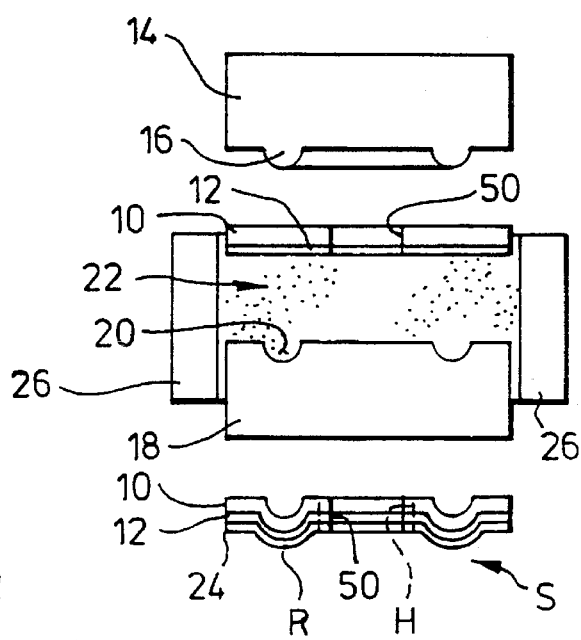

GASKET MANUFACTURE

FIELD OF THE INVENTION

This invention is concerned with a method of manufacturing an embossed metallic sheet coated at least partially with expanded graphite and suitable for use as a gasket or as a component layer of a gasket.

DESCRIPTION OF THE PRIOR ART

Many gaskets for use in industrial and automotive applications comprise a metallic sheet, often of steel, coated on one or more surfaces with a sealing material. The sealing material is, in some cases, expanded graphite which has been compacted. Expanded graphite is also called "exfoliated graphite".

The normal method of coating such a metallic sheet is to make a thin (0.2 to 1.5 mm thick) self-supporting foil of the expanded graphite and to attach the foil to a surface of the reinforcing sheet. This method, however, involves making and handling the thin foil which is easily damaged and so requires extreme care.

Instead of applying an already made foil to the reinforcing sheet, it is known to position a layer of particles of expanded graphite on a surface of the sheet which has been treated with a layer of adhesive, and to press the particles so that the coalesce and form a coating in situ on the reinforcing sheet.

It is known to provide rubber coated gaskets with embossed ridges, e.g. a generally semi-circular (in cross-section) ridge, around the hole in the gasket. These ridges are resilient and cause controlled stress concentrations during use of the gasket.

SUMMARY AND OBJECTS OF THE INVENTION

It is an object of the present invention to provide an efficient method of manufacturing an embossed metallic sheet coated at least partially with expanded graphite and suitable for use as a gasket or as a component layer of a gasket.

The invention provides a method of manufacturing an embossed metallic sheet coated at least partially with expanded graphite and suitable for use as a gasket or as a component layer of a gasket, characterised in that the method comprises positioning a substantially planar metallic sheet between an upper embossing die and a lower embossing die with a layer of particles of expanded graphite between one of said dies and a surface of the sheet, one of said dies having at least one protuberance arranged to emboss a ridge into the sheet, the method also comprising pressing said dies together thereby compressing the particles of expanded graphite, so that they coalesce and form a coating attached to said sheet, and simultaneously embossing the ridge into the sheet and the coating.

In a method in accordance with the invention, the expanded graphite is applied to the planar sheet and the ridge is embossed into the sheet in one operation so that an efficient method of manufacture is provided.

The other of said dies may have a complementary shape to the die which has the protuberance, e.g. it may have a recess to receive the ridge. In some sheets, a portion of the embossed sheet may be planar and parallel to other portions of the sheet and the ridge may connect said portions.

Preferably, said layer of particles is positioned by providing a particle retaining wall surrounding the lower embossing die and projecting upwardly therefrom to a substantially equal extent around the periphery of the wall, filling the space defined by the wall above the lower die with particles of expanded graphite, and skimming the particle layer level with the top of said wall, the planar sheet being positioned on top of the layer of particles. This method provides a convenient way in which the edges of the layer of particles can be confined and a substantially level layer can be formed across the sheet. The presence of the wall also assists in locating the sheet relative to the dies.

Where the sheet is to have expanded graphite coatings on both of the surfaces thereof, a further layer of particles may be positioned between said sheet and the other of said dies, and two layers are pressed into coatings simultaneously. Alternatively, however, the two coatings may be applied sequentially with the embossing taking place simultaneously with the formation of either coating. Where the aforementioned particle retaining wall is used, the further layer of particles may be positioned by raising said wall relative to the lower die after positioning the sheet, filling the space defined by said wall above the planar sheet with particles, and skimming the further particle layer level with the top of said wall.

Instead of positioning the layer of particles on top of the lower die, a method according to the invention may comprise providing a particle-retaining wall surrounding the lower embossing die and projecting upwardly therefrom to a substantially equal extent around the periphery of the wall, positioning the planar sheet on the lower die within said wall, filling the space defined by the wall above the planar sheet with particles of expanded graphite, and skimming the particle layer level with the top of the wall.

At least one hole in the sheet may be cut out therefrom after the expanded graphite has been applied. This may be advantageous in that the ridge may be more easily formed when it is not close to the edge of an existing hole. This can also be achieved by cutting the hole out from the sheet in two stages, a first stage performed before the expanded graphite is applied to the planar sheet, and a second, hole trimming, stage performed on the embossed sheet. In the second stage, the hole created in the first stage is enlarged by the removal of material of the metallic sheet and expanded graphite adhered thereto. Alternatively, during the application of expanded graphite to the planar sheet, a hole may be blanked off by a further protuberance from one of said dies which enters a corresponding recess in the other die. This saves graphite since graphite is not compressed in the area where the hole is positioned.

Preferably, the particles have their mean dimension in the range 0.2 to 2 mm, i.e. the average maximum dimension of the particles is in this range. They may be milled to this size. If the particles are provided in this size range, it is found that they flow better to form the coating or coatings. Such particles are substantially smaller than those conventionally used for making self-supporting foils, which have mean dimensions of 2 to 10 mm.

Where the gasket is for use with substantially planar surfaces, the particle layer or layers may have a thickness of between 2 and 5 mm and the coating or coatings created therefrom may have a thickness of between 20 and 200 microns. However, for some applications, layers up to 100 mm thick may be used to give coatings up to 2 mm thick.

There now follow detailed descriptions, to be read with reference to the accompanying drawings of five methods of manufacturing a gasket which are illustrative of the invention.

BRIEF DESCRIPTION OF THE DRAWINGS

In the drawings:

FIG. 1 is a diagrammatic view showing a cross-section of the apparatus used in the first illustrative method of manufacturing a sheet and also shows diagrammatically the sheet manufactured by the first illustrative method;

FIGS. 2 to 5 are similar to FIG. 1 but illustrate the second to fifth illustrative methods, FIGS. 2 and 4 also showing the gasket manufactured;

DESCRIPTION OF THE PREFERRED EMBODIMENTS

Figure 6:
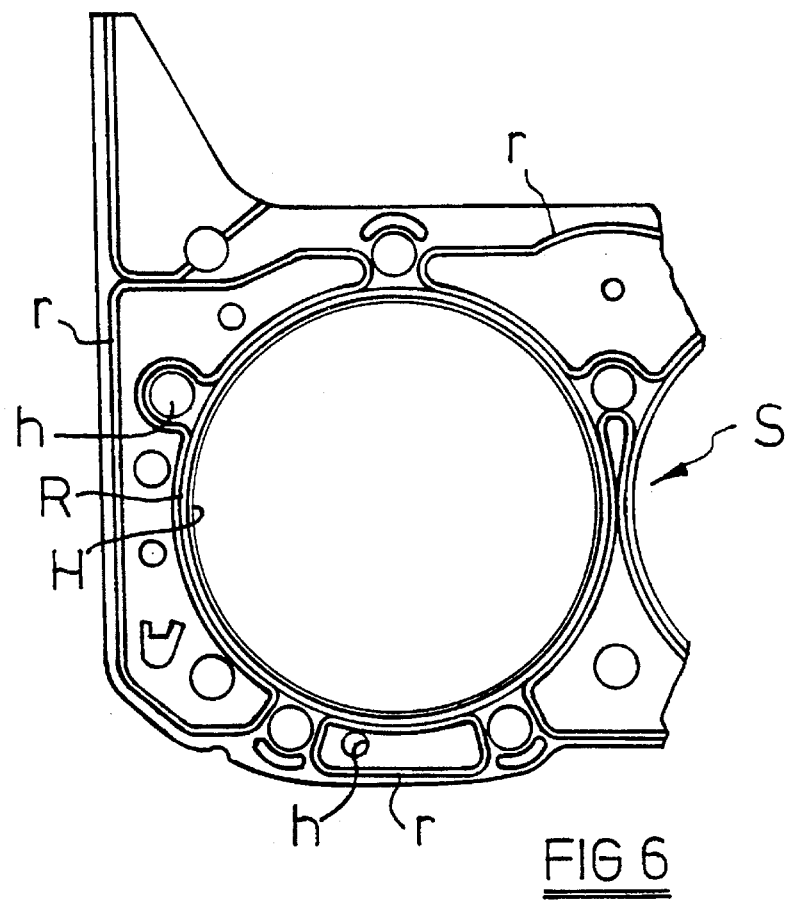
FIG. 6 is a plan view of a portion of a sheet manufactured by the first illustrative method.

The first to the fifth illustrative methods are all methods of manufacturing an embossed steel sheet S at least partially coated with expanded graphite. The sheet S having at least one hole H there-through, the hole H having an embossed ridge R surrounding it. In each of the illustrative methods, a substantially planar steel sheet 10 is first cut to the outline shape required for the finished gasket G and a layer of adhesive 12 is applied to a surface of the sheet 10. It is not, however, necessary to apply the adhesive after cutting the sheet 10 to its outline shape and the cutting to outline shape can be left until the end of the illustrative method. The sheet 10 can be cut out by any of the usual methods and the adhesive 12 can also be applied by any of the usual methods. The adhesive may be, for example, a nitrile-phenolic adhesive which is applied as a solution and, after the expanded graphite has been applied thereto, requires heating to cross-link the adhesive.

The apparatuses used in each of the five illustrative methods are similar in many respects and like parts in the five apparatuses are given the same reference numerals in the drawings and are only described in detail in relation to the first illustrative method.

Figure 7:
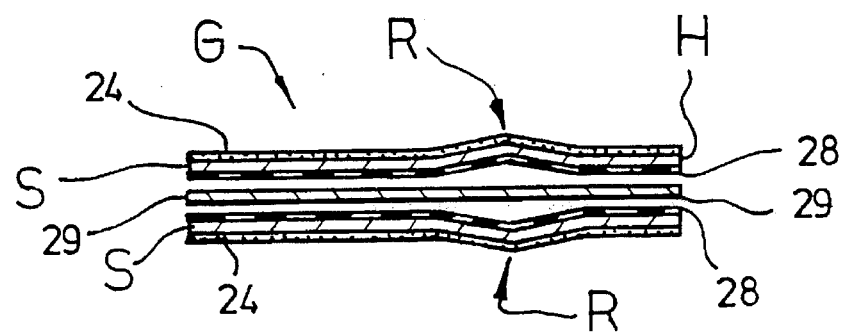
FIG. 7 is a diagrammatic cross-sectional view of a gasket incorporating the sheet shown in FIGS. 1 and 6.

The apparatus shown in FIG. 1 is used in the first illustrative method. This apparatus comprises an upper embossing die 14 which is mounted on the upper platen of a press (not shown). The die 14 has a protuberance 16 extending downwardly therefrom which is arranged to emboss the ridge R into the sheet 10 so that, in the finished sheet S, the ridge R extends around the hole H. In this case, the hole H is circular so that the protuberance 16 is also circular having a greater diameter than the hole H. The protuberance 16 is itself of approximately semi-circular cross-section so that it provides a ridge also of approximately semi-circular cross-section. However, as shown in FIG. 7, the ridge R may be of V-shaped cross-section. The apparatus also comprises a lower embossing die 18 which is mounted on a lower platen of the afore-mentioned press (not shown) in opposed relationship with the die 14. The lower embossing die 18 has a recess 20 therein which is complementary to the protuberance 16 and is arranged to receive the ridge embossed in to the sheet 10.

The first illustrative method comprises positioning the upper embossing die 14, and the lower embossing die 18 on the press in opposed relationship, positioning the metallic, planar sheet 10 between the dies 14 and 18, and positioning a layer of particles 22 of expanded graphite between the lower die 18 and the layer of adhesive 12 on the sheet 10. The method also comprises pressing the dies 14 and 18 together by operation of the afore-mentioned press thereby compressing the particles of expanded graphite in the layer 22, so that they coalesce and form a coating 24 adhered to the adhesive layer 12, and simultaneously embossing the ridge R into the sheet 10 and the coating 24.

In order to position the layer of particles 22, the apparatus used in the first illustrative method also comprises a particle-retaining wall 26. The wall 26 forms an enclosed rectangle, open at the top and at the bottom so that it can surround the lower embossing die 18 and project upwardly therefrom to a substantially equal extent around the periphery of the wall 26. The upper embossing die 14 can fit into the wall 26 as can the sheet 10.

In order to position the layer of particles 22, in the first illustrative method, the space defined by the wall 26 above the lower die 18 is filled with the particles of expanded graphite and the particle layer 22 is skimmed off level with the top of the wall 26. This ensures a substantially uniform layer of particles on the lower die 18 which is confined at its edges by the wall 26. The wall 26 is then raised relative to the lower die 18 and the reinforcing sheet 10 is positioned within the wall 26 on top of the layer 22 with the adhesive layer 12 facing downwardly and in contact with the layer 22 (this condition is shown in FIG. 1). The dies 14 and 18 are then pressed together to compress the particles in the layer 22, so that they coalesce and form the coating 24 adhered to the adhesive layer 12. In this process the upper embossing die 14 is moved downwardly into the wall 26 and engages the sheet 10 pressing it downwardly towards the lower die 18 so that the layer 22 is compressed between the sheet 10 and the die 18. The pressing process which is carried out by operation of the afore-mentioned press also embosses the ridge R into the sheet 10 and the coating 24.

In the first illustrative method, the hole H is punched through the gasket G after the expanded graphite coating 24 has been adhered to the sheet 10. This can be achieved by a punching operation of conventional type.

FIG. 6 illustrates that the sheet S may have further ridges r and holes h which can be formed in the same operations as the ridge R and the hole H.

FIG. 7 shows that the sheet S can be used in a stack-type gasket G. In this case, the opposite surface of the sheet S is coated with nitrile rubber, by a conventional method, to give a coating 28. The coating 28 engages a planar steel sheet 29 of the stack. The stack is completed by an inverted version of the sheet S whose coating 28 also engages the sheet 29.

FIG. 2 illustrates the apparatus used in the second illustrative method. In the second illustrative method, a further layer of adhesive 30 is applied to an opposite surface of the reinforcing sheet 10 to the adhesive layer 12 and a further layer of particles 32 is assembled between the layer of adhesive 30 and the upper die 14. The second illustrative method is otherwise identical to the first illustrative method described above. In the pressing operation, the die 14 compresses the layer 32 to form a further coating 34 adhered to the layer 30 of adhesive. The further layer of particles 32 is positioned by filling the space defined by the wall 26 above the reinforcing sheet 10 after the latter has been positioned within the wall 26 on the layer 22 and the wall 26 has been raised for a second time. The further layer 32 is also skimmed level with the top of the wall 26 before the pressing operation begins. The sheet S produced by the second illustrative method is suitable for use as a gasket itself.

FIG. 3 illustrates the third illustrative method, which is similar to the first illustrative method except that the sheet 10 is positioned on the lower die 18 within the wall 26 with the layer 12 uppermost without previously forming a layer of particles on top of the die 18. Also, the protuberance 16 is provided on the lower die 18 and the recess 20 is in the upper die 14. The third illustrative method continues by filling the space defined by the wall 26 above the sheet 10 with particles of expanded graphite to form a layer 40 and skimming the particle layer 40 level with the top of the wall 26. The third illustrative method then continues in similar fashion to the first illustrative method with the pressing operation forming a coating 24 adhered to the adhesive layer 12.

In the first, second and third illustrative methods, the hole H is cut out from the gasket after the expanded graphite has been applied to the sheet 10. In the fourth illustrative method, however, illustrated by FIG. 4, the hole H is cut out from the sheet in two stages. In a first stage, performed before the expanded graphite is applied to the sheet 10, a smaller hole 50 is punched out of the sheet 10 and the coating 24 is applied and the ridge R is embossed as in the first illustrative method. In a second, hole trimming stage, performed on the embossed sheet S, the hole 50 is enlarged by punching out a ring around it of the metal and of graphite adhered thereto.

In the fifth illustrative method shown in FIG. 5, the hole H is cut through the sheet 10 before the sheet 10 is positioned between the dies 14 and 18. In this case, the lower die 18 has a further protuberance 60 which is generally cylindrical and enters the hole H in the sheet 10 and a corresponding recess 62 in the die 14. The protuberance 60 acts to blank off the hole H in the sheet 10 so that expanded graphite is not required in the area which will form the hole H.

It will be apparent that various combinations of the five illustrative methods can be used. For example, a protuberance similar to the protuberance 60 can be utilised in a method similar to the first illustrative method.

We claim:

1. A method of manufacturing an embossed metallic sheet coated at least partially with expanded graphite and suitable for use as a gasket or as a component layer of a gasket, wherein the method comprises positioning a substantially planar metallic sheet between an upper embossing die and a lower embossing die with a layer of particles of expanded graphite between one of said dies and a surface of the sheet, one of said dies having at least one protuberance, the other of said dies having a corresponding recess complementary to the protuberance, said method comprising relatively moving the dies to emboss a ridge into the sheet and simultaneously compressing the particles of expanded graphite, so that they coalesce and form a coating attached to said sheet.

2. A method according to claim 1, wherein said layer of particles is positioned by providing a vertically movable particle retaining wall surrounding the lower embossing die and projecting upwardly therefrom to a substantially equal extent around the periphery of the wall, filling the space defined by the wall above the lower die with particles of expanded graphite, and skimming the particle layer level with the top of said wall, the planar metallic sheet then being positioned on top of the layer of particles.

3. A method according to claim 1, comprising positioning a further layer of particles between said planar sheet and the other of said dies, retaining said particles by a retaining wall and simultaneously pressing the two layers into coatings for both sides of said sheet.

4. A method according to claim 3, wherein the further layer of particles is positioned by raising said wall relative to the lower die after positioning the planar sheet, filling the space defined by said wall above the planar sheet with particles, and skimming the further particle layer level with the top of said wall.

5. A method according to claim 1, wherein the method comprises providing a particle retaining wall surrounding the lower embossing die and projecting upwardly therefrom to a substantially equal extent around the periphery of the wall, positioning the planar sheet on the lower die within said wall, filling the space defined by the wall above the planar sheet with particles of expanded graphite, and skimming the particle layer level with the top of the wall.

6. A method according to claim 1, wherein at least one hole is cut out from the sheet in two stages, the first stage being a hole forming punching stage performed before the expanded graphite is applied to the planar sheet, and the second stage being a hole trimming punching stage performed on the embossed sheet.

7. A method according to claim 1, wherein said metallic sheet is further provided with a hole and wherein during the application of expanded graphite to said planar sheet, said hole is blanked off by a further protuberance from one of said dies which enters a corresponding further recess in the other die.

8. A method according to claim 1, wherein the method also comprises applying a layer of adhesive to one or both surfaces of the planar sheet before it is positioned between the dies.

9. A method according to claim 1, wherein the particles have their mean dimensions in the range 0.2 to 2 mm.

10. A method according to claim 1, wherein the particle layer has a thickness of between 2 and 5 mm.

\* \* \* \* \*